United States Patent
Tao et al.

(10) Patent No.: US 8,644,204 B2
(45) Date of Patent: Feb. 4, 2014

(54) SYSTEMS AND METHODS FOR OPERATION MODE TRANSITION IN WIRELESS COMMUNICATIONS

(75) Inventors: Ming-Hung Tao, Tainan (TW); Ying-Chuan Hsiao, Zhubei (TW)

(73) Assignee: Industrial Technology Research Institute, Chutung, Hsinchu (TW)

(*) Notice: Subject to any disclaimer, the term of this patent is extended or adjusted under 35 U.S.C. 154(b) by 281 days.

(21) Appl. No.: 12/951,795

(22) Filed: Nov. 22, 2010

(65) Prior Publication Data

US 2011/0216681 A1    Sep. 8, 2011

Related U.S. Application Data

(60) Provisional application No. 61/310,838, filed on Mar. 5, 2010.

(51) Int. Cl.
*G08C 17/00* (2006.01)
*H04L 12/28* (2006.01)

(52) U.S. Cl.
USPC ........ 370/311; 370/351; 370/315; 455/343.1; 455/574; 455/572; 455/522

(58) Field of Classification Search
USPC ............... 370/351, 311, 315; 455/572, 127.5, 455/574, 343.1, 522
See application file for complete search history.

(56) References Cited

U.S. PATENT DOCUMENTS

| | | | |
|---|---|---|---|
| 5,686,896 A | 11/1997 | Bergman | |
| 6,108,316 A | 8/2000 | Agrawal et al. | |
| 6,275,712 B1 * | 8/2001 | Gray et al. | 455/522 |
| 7,003,331 B2 | 2/2006 | Cromer et al. | |
| 7,474,887 B2 | 1/2009 | Chandra et al. | |
| 7,583,984 B2 * | 9/2009 | Sun et al. | 455/572 |
| 7,598,880 B2 | 10/2009 | Powell et al. | |
| 7,636,042 B2 | 12/2009 | Hameed | |
| 2003/0033394 A1 * | 2/2003 | Stine | 709/222 |
| 2005/0086273 A1 * | 4/2005 | Loebbert et al. | 707/204 |
| 2008/0253466 A1 * | 10/2008 | Fu | 375/240.26 |
| 2009/0251309 A1 * | 10/2009 | Yamasuge | 340/539.3 |
| 2010/0302980 A1 * | 12/2010 | Ji et al. | 370/311 |
| 2011/0110289 A1 * | 5/2011 | Venkatachalam et al. | 370/315 |

OTHER PUBLICATIONS

IEEE 802.16, "Broadband Wireless Access Working Group" (Jan. 5, 2010).
Draft Amendment to IEEE Standard for Local and Metropolitan Area Networks; Part 16: Air Interface for Fixed and Mobile Broadband Wireless Access Systems; IEEE 802.16m/D4; Feb. 3, 2010; pp. 1-797.

(Continued)

*Primary Examiner* — Andrew Chriss
*Assistant Examiner* — Jamal Javaid
(74) *Attorney, Agent, or Firm* — Finnegan, Henderson, Farabow, Garrett & Dunner, LLP

(57) ABSTRACT

A method for a base station to instruct a mobile station to perform an operation mode transition, the method including: receiving battery level information from the mobile station, the battery level information being included in a signaling header; determining, based on the battery level information, if the mobile station can perform an operation mode transition; and instructing the mobile station to perform the operation mode transition, if it is determined that the mobile station can perform the operation mode transition.

11 Claims, 8 Drawing Sheets

(56) References Cited

OTHER PUBLICATIONS

IEEE 802.16 Broadband Wireless Access Working Group <http://ieee802.org/16>; IEEE 802.16m System Description Document (SDD); IEEE 802.16m-09/0034r2; Sep. 24, 2009; pp. 1-163.
Miao, et al., Energy-Efficient Design in Wireless OFDMA; IEEE 978-1-4244-2075-9/08; Copyright 2008; pp. 3307-3312.
Cox, et al., The Effectiveness of Battery-Conserving Protocols in Wireless LANs; IEEE 0-7803-8219-6/04; Copyright 2004; three (3) pages.
Selvaradjou, et al., A New Battery and Redundancy Aware Node Scheduling Protocol for Wireless Sensor Networks; Communication Systems Software and Middleware and Workshops, 2008, Comsware 2008, $3^{rd}$ International Conference; Jan. 6-10, 2008; seven (7) pages.
IEEE 802.16 Broadband Wireless Access Working Group <http://ieee802.org/16>; AMS Battery Level Report (16.2.22); IEEE C802.16m-10/0004r2; Jan. 5, 2010; pp. 1-4.

\* cited by examiner

| Syntax | Size (bit) | Notes |
|---|---|---|
| MS Battery Level Report header () { | - | - |
| FID | 4 | Flow Identifier, which indicates MAC signaling header |
| Type | 3 | MAC signaling header type = Battery level report |
| MS Battery Status  ~512 | 1 | 0b0: The MS is plugged into a power source. 0b1: The MS is not plugged into a power source. |
| Battery Level Indication  ~514 | 1 | 0b0: The detailed battery level information is not included. 0b1: The detailed battery level information is included. |
| If (Battery Level Indication = 1) { | - | - |
| MS Battery Level  ~516 | 3 | The field appears only when the Battery Level Indication is set to 1. 0b000: Battery level is > 75% and <= 100% 0b001: Battery level is > 50% and <= 75% 0b010: Battery level is > 25% and <= 50% 0b011: Battery level is > 5% and <= 25% 0b100: Battery level is below 5% 0b101 – 0b111: Reserved |
| } | - | - |
| else { | - | - |
| Reserved | 3 | - |
| } | - | - |
| } | - | - |

Fig. 5B

SYSTEMS AND METHODS FOR OPERATION MODE TRANSITION IN WIRELESS COMMUNICATIONS

RELATED APPLICATIONS

This application is based upon and claims the benefit of priority from U.S. Provisional Patent Application No. 61/310,838, filed Mar. 5, 2010, the entire contents of which are incorporated herein by reference.

TECHNICAL FIELD

This disclosure relates to systems and methods for operation mode transition in wireless communications.

BACKGROUND

In a wireless communication system, a mobile station (MS) may operate in different operation modes. For example, in a wireless communication system based on the IEEE 802.16 family of standards or the Long Term Evolution (LTE) standard, when an MS is connected with a base station (BS), the MS may operate in an active mode in which the MS stays awake all the time for communicating with the BS, or operate in a sleep mode in which the MS periodically wakes up for occasional data traffic, or operate in a client cooperation mode in which the MS operates as a relay node for relaying data from the BS to another MS. When the MS is disconnected from the BS, the MS may operate in an idle mode in which the MS is periodically paged by a paging controller in the communication system, or operate in a deregistration with content retention (DCR) mode in which information regarding the MS is retained in an access service network (ASN) gateway in the communication system.

The MS may change its operation mode according to a communication traffic condition between the MS and the BS, to save power. For example, if the MS needs to occasionally transmit data to, or receive data from, the BS, the MS may change its operation mode from the active mode to the sleep mode. Also for example, the MS may further change its operation mode to the idle mode, if the MS does not need to transmit data to, or receive data from, the BS for a relatively long time period. Traditionally, the MS initiates an operation mode transition for itself.

FIG. 1 illustrates a traditional method 100 for an MS 102 to perform an operation mode transition, where the MS 102 initiates the operation mode transition for itself. Referring to FIG. 1, the MS 102 may currently operate in the active mode, but determines that it only needs to occasionally transmit data to, or receive data from, a BS 104. Therefore, the MS 102 sends a request to the BS 104, requesting a transition to the sleep mode (112). The BS 104 receives the request from the MS 102, and sends a response to the MS 102, indicating that the MS 102 may change its operation mode to the sleep mode (114). The MS 102 may then send an acknowledgement to the BS 104 and change its operation mode to the sleep mode (116).

In reality, when a plurality of MSs in the communication system each use the method 100 to perform an operation mode transition, there may be unsuccessful attempts from the MSs since each MS is not aware of the downlink traffic to be scheduled for the MS. These unsuccessful attempts may result in undesirable signaling overhead. In addition, different designs for the MSs may raise an unfairness issue.

FIG. 2 illustrates a traditional format of a media access control (MAC) management message 200 transmitted between a BS and an MS. For example, referring to FIG. 2, the MS may include control information in a data payload 208 of the MAC management message 200 and sends the MAC management message 200 to the BS. The MAC management message 200 may include a header which further includes a flow identifier (FID) 202, an extended header (EH) indicator 204, and a length indicator 206, and the data payload 208. For example, the FID 202 may have 4 bits and indicate a connection between the BS and the MS. Also for example, the EH indicator 204 may have 1 bit, and the length indicator 206 may have 11 bits and indicate a length of the data payload 208.

SUMMARY

According to a first aspect of the present disclosure, there is provided a method for a base station to instruct a mobile station to perform an operation mode transition, comprising: receiving battery level information from the mobile station, the battery level information being included in a signaling header; determining, based on the battery level information, if the mobile station can perform an operation mode transition; and instructing the mobile station to perform the operation mode transition, if it is determined that the mobile station can perform the operation mode transition.

According to a second aspect of the present disclosure, there is provided a base station to instruct a mobile station to perform an operation mode transition, comprising: a processor, the processor being configured to: receive battery level information from the mobile station, the battery level information being included in a signaling header; determine, based on the battery level information, if the mobile station can perform an operation mode transition; and instruct the mobile station to perform the operation mode transition, if it is determined that the mobile station can perform the operation mode transition.

According to a third aspect of the present disclosure, there is provided a method for a mobile station to report battery level information to a base station, comprising: including the battery level information in a signaling header; and transmitting to the base station the battery level information included in the signaling header.

According to a fourth aspect of the present disclosure, there is provided a mobile station to report battery level information to a base station, comprising: a processor, the processor being configured to: include the battery level information in a signaling header; and transmit to the base station the battery level information included in the signaling header.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

FIG. 5B illustrates a format of a signaling header used by an MS to report its battery level information to a BS, according to an exemplary embodiment.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

Figure 1:
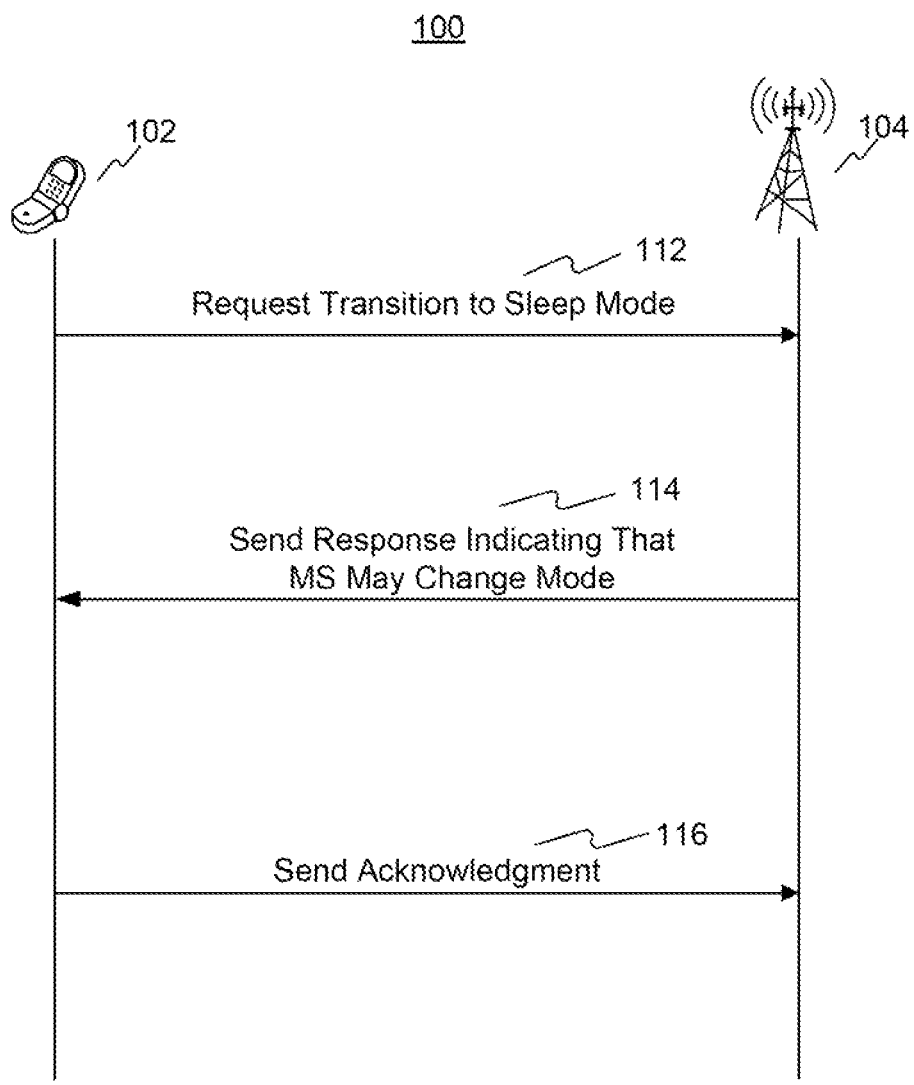
FIG. 1 illustrates a traditional method for an MS to perform an operation mode transition.
Figure 2:
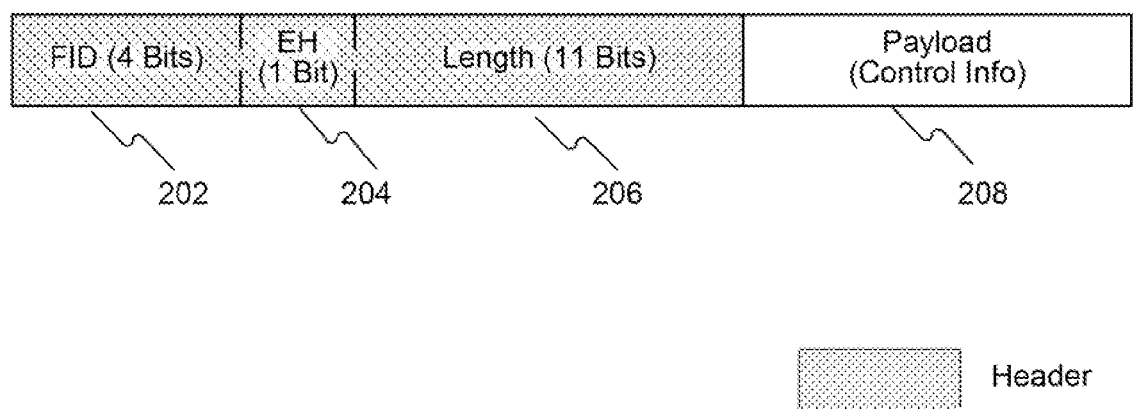
FIG. 2 illustrates a traditional format of a media access control (MAC) management message transmitted between a BS and an MS.
Figure 3:
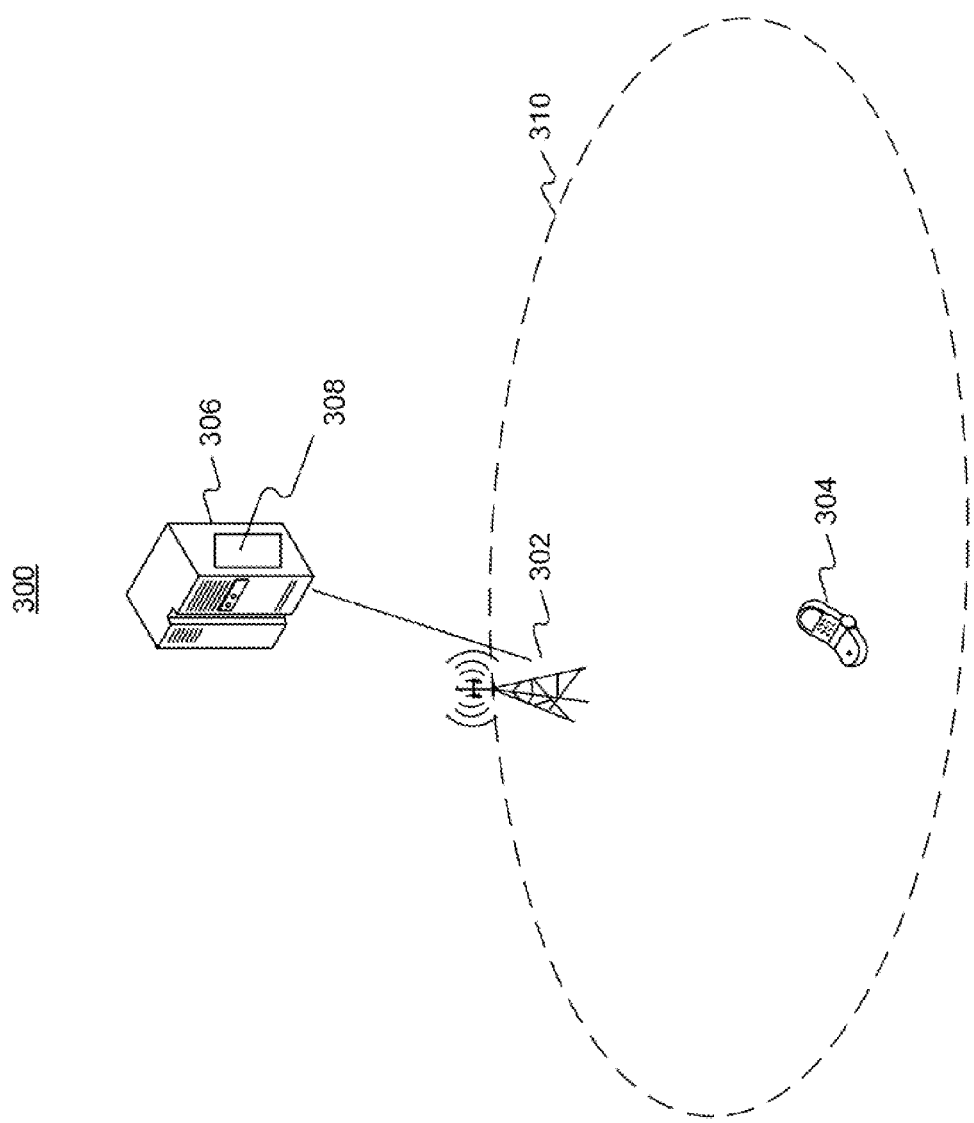
FIG. 3 illustrates a block diagram of a communication system, according to an exemplary embodiment.

FIG. 3 illustrates a block diagram of a communication system 300, according to an exemplary embodiment. The communication system 300 may be configured to operate based on, e.g., an orthogonal frequency-division multiplexing (OFDM) technique, a code division multiple access (CDMA) technique, a multiple-carrier technique, a multiple-input and multiple-output (MIMO) technique, etc.

In exemplary embodiments, the communication system 300 may be configured to operate in accordance with different communication standards such as the IEEE 802.16 family of standards, the 3rd Generation Partnership Project (3GPP) standard, the High-Speed Packet Access (HSPA) standard, the Long Term Evolution (LTE) standard, the International Mobile Telecommunications-2000 (IMT-2000) standard, the IMT-Advance standard, the IMT family of standards, etc.

In exemplary embodiments, the communication system 300 may include at least one base station (BS) 302 and at least one mobile station (MS) 304. The communication system 300 may additionally include an access service network (ASN) gateway 306, which further includes a paging controller 308. The MS 304 may be located in a signal coverage area 310 of the BS 302.

In exemplary embodiments, the MS 304 may operate in different operation modes. For example, when the MS 304 is connected with the BS 302, the MS 304 may operate in an active mode in which the MS 304 stays awake all the time for communicating with the BS 302, or operate in a sleep mode in which the MS 304 periodically wakes up for occasional data traffic, or operate in a client cooperation mode in which the MS 304 operates as a relay node for relaying data from the BS to another MS (not shown) in the communication system 300. When the MS 304 is disconnected from the BS 302, the MS 304 may operate in an idle mode in which the MS is periodically paged by the paging controller 308, or operate in a deregistration with content retention (DCR) mode in which information regarding the MS 304 is retained in the ASN gateway 306. In exemplary embodiments, the BS 302 may initiate an operation mode transition for the MS 304, referred to herein as a BS-initiated operation mode transition.

Figure 4:
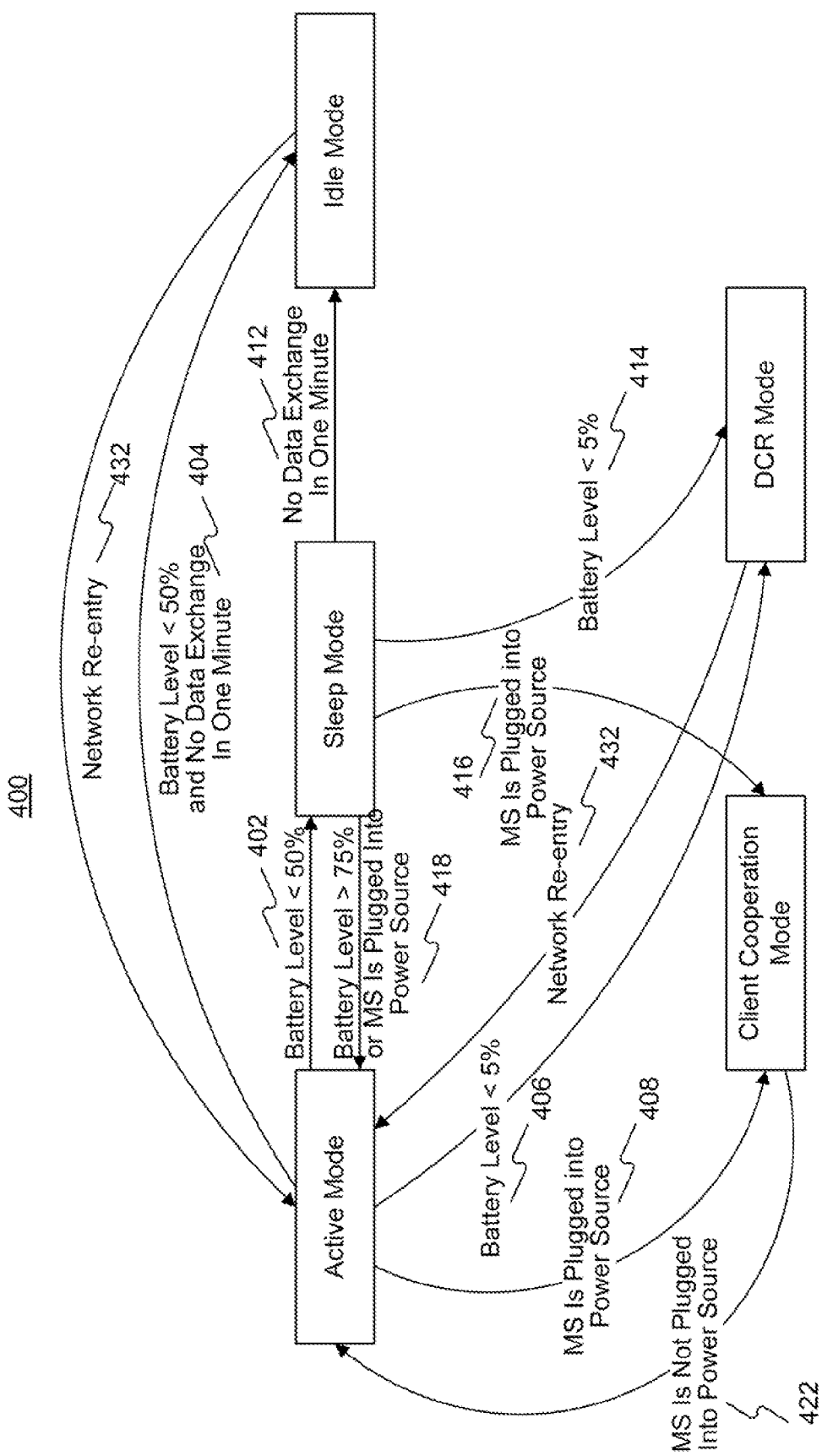
FIG. 4 illustrates a method for a BS-initiated operation mode transition, according to an exemplary embodiment.

FIG. 4 illustrates a method 400 for a BS-initiated operation mode transition, according to an exemplary embodiment.

Referring to FIGS. 3 and 4, the MS 304 may report its battery level information to the BS 302, and the BS 302 may initiate the operation mode transition for the MS 304 based on a current operation mode of the MS 304 and the battery level information reported by the MS 304. For example, the battery level information may include a battery level indicating a percentage of remaining battery power of the MS 304.

In exemplary embodiments, the MS 304 may currently operate in the active mode. Accordingly, the BS 302 may instruct the MS 304 to leave the active mode and to enter the sleep mode, if the BS 302 determines that the battery level of the MS 304 is below a first predetermined threshold value, e.g., 50% (402). Alternatively, the BS 302 may instruct the MS 304 to leave the active mode and to enter the idle mode, if the BS 302 determines that the battery level of the MS 304 is below the first predetermined threshold value, i.e., 50%, and that there is no data exchange between the MS 304 and the BS 302 for a predetermined period of time, e.g., one minute (404). Alternatively, the BS 302 may instruct the MS 304 to leave the active mode and to enter the DCR mode, if the BS 302 determines that the battery level of the MS 304 is below a second predetermined threshold value, e.g., 5% (406). Alternatively, the BS 302 may instruct the MS 304 to leave the active mode and to enter the client cooperation mode, if the BS 302 determines that the MS 304 is plugged into a power source (408).

In exemplary embodiments, the MS 304 may currently operate in the sleep mode. Accordingly, the BS 302 may instruct the MS 304 to leave the sleep mode and to enter the idle mode, if the BS 302 determines that there is no data exchange between the MS 304 and the BS 302 for the predetermined period of time, i.e., one minute (412). Alternatively, the BS 302 may instruct the MS 304 to leave the sleep mode and to enter the DCR mode, if the BS 302 determines that the battery level of the MS 304 is below the second predetermined threshold value, i.e., 5% (414). Alternatively, the BS 302 may instruct the MS 304 to leave the sleep mode and to enter the client cooperation mode, if the BS 302 determines that the MS 304 is plugged into a power source (416). Alternatively, the BS 302 may instruct the MS 304 to leave the sleep mode and to enter the active mode, if the BS 302 determines that the battery level of the MS 304 is above a third predetermined threshold value, e.g., 75% (418).

In exemplary embodiments, the MS 304 may currently operate in the client cooperation mode. Accordingly, the BS 302 may instruct the MS 304 to leave the client cooperation mode and to enter the active mode, if the BS 302 determines that the MS 304 is not plugged into a power source (422).

In exemplary embodiments, the MS 304 may currently operate in the idle mode or the DCR mode. As described above, when the MS 304 operates in the idle mode or the DCR mode, the MS 304 is disconnected from the BS 302. Accordingly, the MS 304 may perform network re-entry to re-establish wireless connection with the BS 302 (432), and enter the active mode, when, e.g., the MS 304 needs to send data to the BS 302.

In exemplary embodiments, when the BS 302 instructs the MS 304 to enter the sleep mode or the idle mode, the BS 302 may determine configuration parameters to be used for the MS 304 in the sleep mode or the idle mode, e.g., a sleep cycle length, based on the battery level information reported by the MS 304.

In exemplary embodiments, when operating in the DCR mode, the MS 304 may deregister from its serving BS, i.e., the BS 302, and also from the network. As a result, the MS 304 may not be provided with services. However, information regarding the MS 304 may be retained in the ASN gateway 306, so that when the MS 304 re-enters the network, its reregistration may take a short time.

In exemplary embodiments, when operating in the client cooperation mode, the MS 304 may become an intermediate service provider for other MSs (not shown) in the communication system 300 that operate in the active mode or in the sleep mode. The MS 304 may relay data received from the BS 302 to the other MSs.

In exemplary embodiments, the method 400 for the BS-initiated operation mode transition may have the following advantages. For example, unsuccessful attempts for entry into the sleep mode or the idle mode by the MS 304 may be avoided. In addition, signaling overhead for a BS-initiated operation mode transition is generally smaller compared to that for an MS-initiated mode transition. Further, a BS-initiated mode transition may decrease an implementation cost for the MS 304, since it allows the MS 304 to be designed without implementing the initiating function for entering the sleep mode or the idle mode. As a result, the MS 304 may have a more predictable operation time. Further, if the MS 304 is turned off because, e.g., the battery power of the MS 304 is running low, the method 400 may enable the MS 304 to re-enter the network in a short time after being turned on with a refreshed battery. Additionally, the method 400 may enable the MS 304 to operate in the client cooperation mode only if the MS 304 is plugged into a power source. By employing this condition, the client cooperation mode may not cause the MS 304 to have a shorter operation time as when the MS 304 uses its battery as the power source.

Figure 5A:
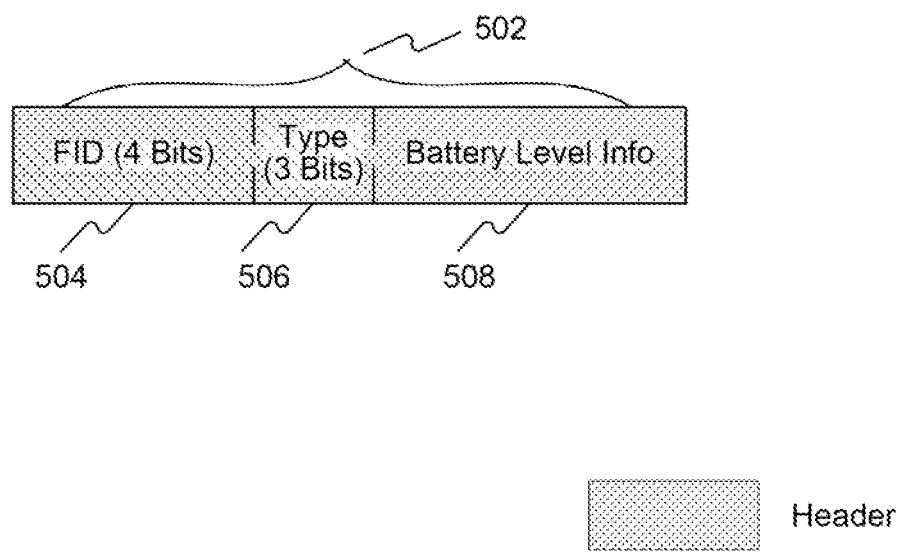
FIG. 5A illustrates a method for an MS to report its battery level information to a BS, according to an exemplary embodiment.

As described above, the MS 304 may report its battery level information to the BS 302, and the BS 302 may initiate the operation mode transition for the MS 304 based on the current operation mode of the MS 304 and the battery level information reported by the MS 304. FIG. 5A illustrates a method 500 for the MS 304 (FIG. 3) to report its battery level information to the BS 302 (FIG. 3), according to an exemplary embodiment. Referring to FIGS. 3 and 5A, the MS 304 may include its battery level information in a signaling header 502, which is re-formatted from a generic media access control (MAC) header, and transmit to the BS 302 the battery level information included in the signaling header 502. The signaling header 502 may include a flow identifier (FID) 504, a type indicator 506, and a battery level information field 508. For example, the FID 504 may have 4 bits and indicate an identification of the signaling header 502. Also for example, the type indicator 506 may have 3 bits and indicate a type of the signaling header 502 is to report battery level information. Further for example, the battery level information field 508 may have a dynamic size and include the actual battery level information that the MS 304 reports to the BS 302.

Generally, battery level information requires only a few bits, e.g., fewer than 10 bits. Using a signaling header that has a dynamic size and has no following payload to report battery level information may reduce signaling overhead, compared to using a MAC management message, which may include a generic MAC header having a fixed size, a data payload, and a cyclic redundancy check (CRC) code.

In exemplary embodiments, the MS 304 may report its battery level information to the BS 302 periodically, or when being polled by the BS 302 for its battery information. The MS 304 may also report its battery level information to the BS 302 when a battery level, or a battery status, of the MS 304 changes. If the MS 304 periodically reports the battery level information to the BS 302, there may be provided a common report timer in both the BS 302 and the MS 304, and the battery level information may be used by the BS 302 to check whether or not the MS 304 is connected with the BS 302. If the timer expires and the BS 302 has not received the battery level information from the MS 304, the BS 302 may poll the MS 304 for the battery information. Alternatively, if the MS 304 reports the battery level information to the BS 302 only when the battery level changes, the BS 302 is typically configured to be able to request the MS 304 to report its battery level information.

FIG. 5B illustrates a format 510 of the signaling header 502 (FIG. 5A) used by the MS 304 (FIG. 3) to report its battery level information to the BS 302 (FIG. 3), according to an exemplary embodiment. Referring to FIGS. 3, 5A, and 5B, as described above, the signaling header 502 may include the FID 504, the type indicator 506, and the battery level information field 508.

In exemplary embodiments, the battery level information field 508 includes a first parameter 512 referred to herein as "MS Battery Status," and a second parameter 514 referred to herein as "Battery Level Indication." The MS Battery Status parameter 512 indicates whether or not the MS 304 is plugged into a power source. For example, if the MS Battery Status parameter 512 has a value of 0, it indicates that the MS 304 is plugged into a power source. Otherwise, if the MS Battery Status parameter 512 has a value of 1, it indicates that the MS 304 is not plugged into a power source.

The Battery Level Indication parameter 514 indicates whether or not a battery level of the MS 304 is included in the signaling header 502, the battery level indicating a percentage of remaining battery power of the MS 304. For example, if the Battery Level Indication parameter 514 has a value of 0, it indicates that the battery level of the MS 304 is not included in the signaling header 502. Otherwise, if the Battery Level Indication parameter 514 has a value of 1, it indicates that the battery level of the MS 304 is included in the signaling header 502. If the battery level of the MS 304 is included in the signaling header 502, i.e., the Battery Level Indication parameter 514 is equal to 1, a third parameter 516 referred to herein as "MS Battery Level" is further included in the battery level information field 508. The MS Battery Level parameter 516 may have 3 bits and include the battery level of the MS 304. For example, as shown in FIG. 5B, if the 3 bits are 011, the battery level is above 5%, and below or equal to 25%.

Figure 6:
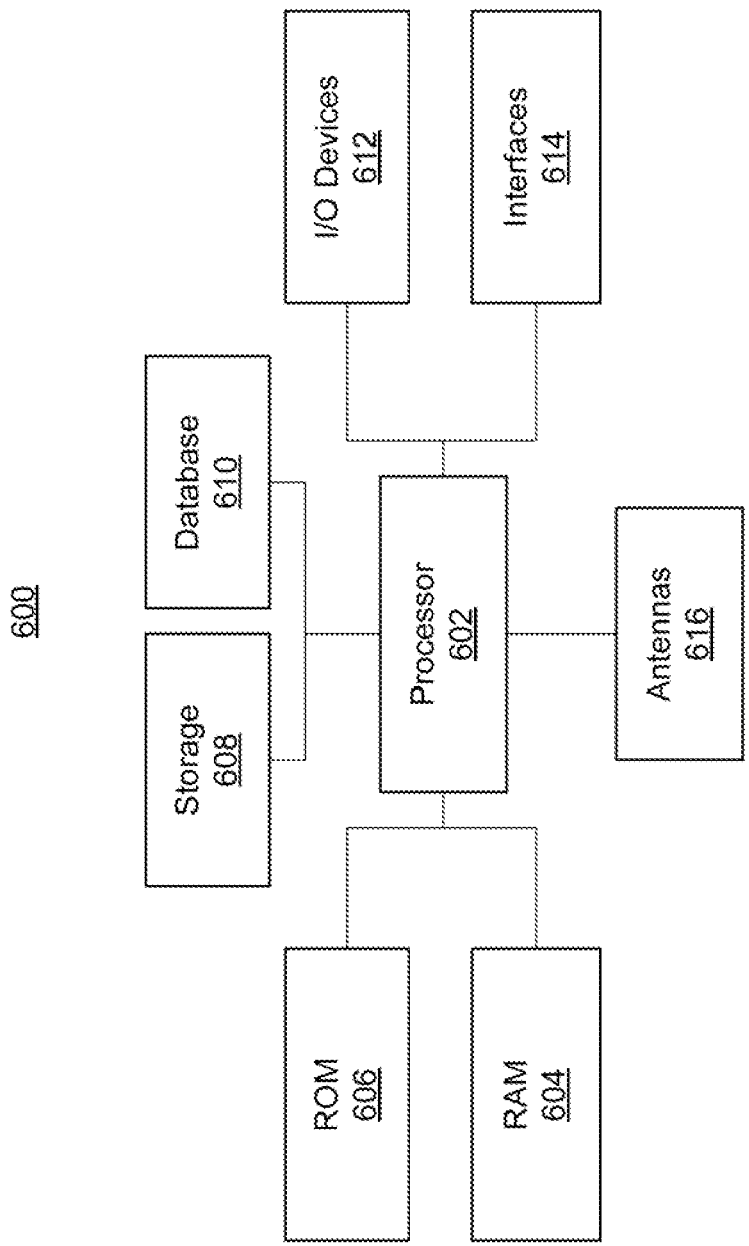
FIG. 6 illustrates a block diagram of a BS, according to an exemplary embodiment.

FIG. 6 illustrates a block diagram of a BS 600, according to an exemplary embodiment. For example, the BS 600 may be the BS 302 (FIG. 3). Referring to FIG. 6, the BS 600 may include one or more of the following components: a processor 602 configured to execute computer program instructions to perform various processes and methods, random access memory (RAM) 604 and read only memory (ROM) 606 configured to access and store information and computer program instructions, storage 608 to store data and information, databases 610 to store tables, lists, or other data structures, I/O devices 612, interfaces 614, antennas 616, etc. Each of these components is well-known in the art and will not be discussed further.

Figure 7:
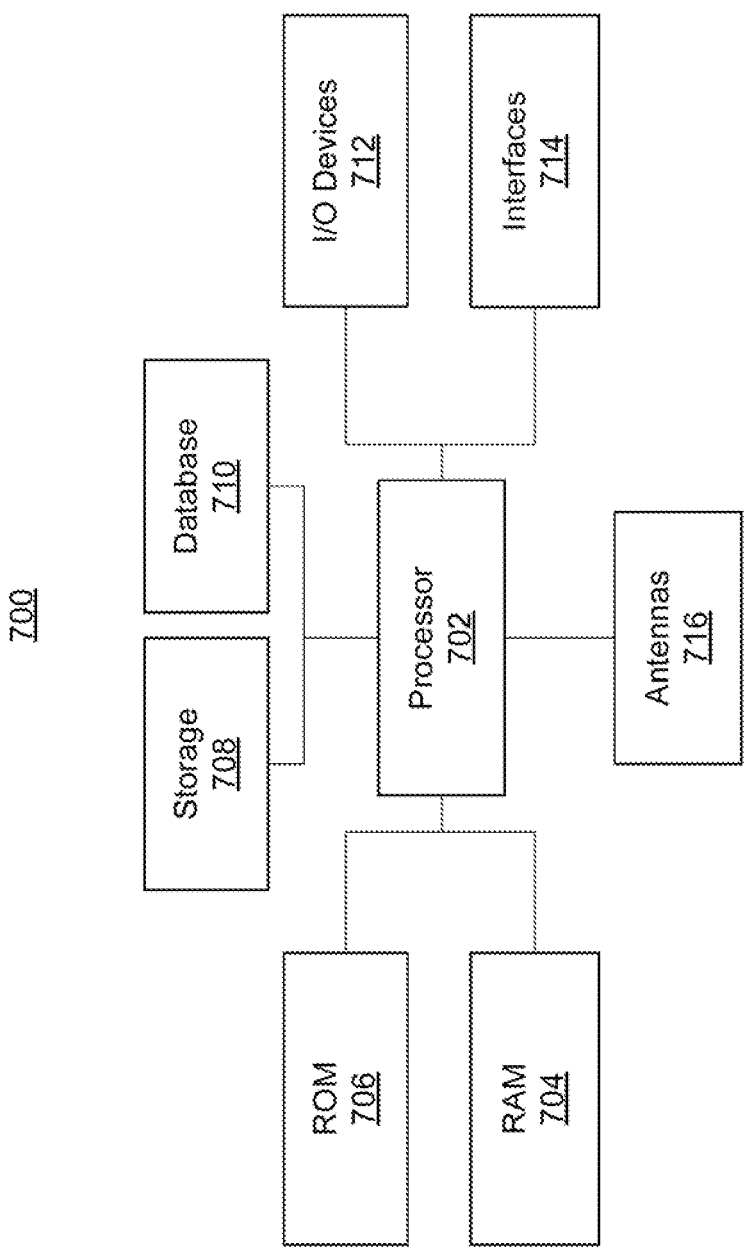
FIG. 7 illustrates a block diagram of an MS, according to an exemplary embodiment.

FIG. 7 illustrates a block diagram of an MS 700, according to an exemplary embodiment. For example, the MS 700 may be the MS 304 (FIG. 3). Referring to FIG. 7, the MS 700 may include one or more of the following components: a processor 702 configured to execute computer program instructions to perform various processes and methods, random access memory (RAM) 704 and read only memory (ROM) 706 configured to access and store information and computer program instructions, storage 708 to store data and information, databases 710 to store tables, lists, or other data structures, I/O devices 712, interfaces 714, antennas 716, etc. Each of these components is well-known in the art and will not be discussed further.

Other embodiments of the invention will be apparent to those skilled in the art from consideration of the specification and practice of the embodiments disclosed herein. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a base station to instruct a mobile station to perform an operation mode transition, comprising:
   receiving battery level information from the mobile station, the battery level information being included in a signaling header that has a dynamic size and has no payload;
   determining, based on the battery level information, if the mobile station can perform an operation mode transition; and
   instructing the mobile station to perform the operation mode transition, if it is determined that the mobile station can perform the operation mode transition,
   wherein when the mobile station operates in one of an active mode or a sleep mode, the determining comprises:
      determining by the base station, if the received battery level information indicates that the mobile station is coupled to a power source, that the mobile station can perform an operation mode transition from the active mode or the sleep mode to a client cooperation mode in which the mobile station relays data from the base station to another mobile station; and
      determining by the base station, if a battery level of the mobile station included in the received battery level information satisfies a predetermined condition, that the mobile station can perform an operation mode transition from the active mode or the sleep mode to a deregistration with content retention (DCR) mode.

2. The method of claim 1, wherein the receiving comprises: periodically receiving the battery level information from the mobile station.

3. The method of claim 1, wherein the receiving comprises: polling the mobile station to receive the battery information.

4. The method of claim 1, wherein the receiving comprises: receiving the battery level information when the battery level of the mobile station changes.

5. The method of claim 1, wherein the receiving comprises: receiving the battery level information from the mobile station, the battery level information including a parameter indicating whether or not the mobile station is plugged into a power source.

6. The method of claim 1, wherein the receiving comprises: receiving the battery level information including a parameter indicating that the battery level of the mobile station is not included in the battery level information.

7. The method of claim 1, wherein the receiving comprises: receiving the battery level information including a parameter indicating the battery level of the mobile station is included in the battery level information, and including the battery level indicating a percentage of remaining battery power of the mobile station.

8. The method of claim 7, wherein when the mobile station operates in the active mode, the method further comprises:
   determining that the mobile station can perform an operation mode transition to the sleep mode, if the battery level is below a first predetermined threshold value;
   determining that the mobile station can perform an operation mode transition to an idle mode, if the battery level is below the first predetermined threshold value and there is no data exchange between the base station and the mobile station for a predetermined period of time; and
   determining that the mobile station can perform an operation mode transition to the DCR mode, if the battery level is below a second predetermined threshold value.

9. The method of claim 7, wherein when the mobile station operates in the sleep mode, the method further comprises:
   determining that the mobile station can perform an operation mode transition to the active mode, if the battery level is above a first predetermined threshold value;
   determining that the mobile station can perform an operation mode transition to an idle mode, if there is no data exchange between the base station and the mobile station for a predetermined period of time; and
   determining that the mobile station can perform an operation mode transition to the DCR mode, if the battery level is below a second predetermined threshold value.

10. The method of claim 1, wherein when the base station determines that the mobile station can perform an operation mode transition to the sleep mode or to an idle mode, the method further comprises:
   determining, based on the battery level information, configuration parameters to be used for the mobile station in the sleep mode or the idle mode.

11. A base station to instruct a mobile station to perform an operation mode transition, comprising:
   a memory containing instructions; and
   a processor, the processor being configured to execute the instructions to:
      receive battery level information from the mobile station, the battery level information being included in a signaling header that has a dynamic size and has no payload;
      determine, based on the battery level information, if the mobile station can perform an operation mode transition; and
      instruct the mobile station to perform the operation mode transition, if it is determined that the mobile station can perform the operation mode transition,
   wherein when the mobile station operates in one of an active mode or a sleep mode, the processor is further configured to:
      determine, if the received battery level information indicates that the mobile station is plugged into a power source, that the mobile station can perform an operation mode transition from the active mode or the sleep mode to a client cooperation mode in which the mobile station relays data from the base station to another mobile station; and
      determine, if a battery level of the mobile station included in the received battery level information satisfies a predetermined condition, that the mobile station can perform an operation mode transition from the active mode or the sleep mode to a deregistration with content retention (DCR) mode.

* * * * *